United States Patent [19]

Pellerite et al.

[11] Patent Number: 5,851,674
[45] Date of Patent: Dec. 22, 1998

[54] ANTISOILING COATINGS FOR ANTIREFLECTIVE SURFACES AND METHODS OF PREPARATION

[75] Inventors: Mark J. Pellerite; Judith M. Invie; Dong-Wei Zhu, all of St. Paul, Minn.

[73] Assignee: Minnesota Mining and Manufacturing Company, St. Paul, Minn.

[21] Appl. No.: 902,666

[22] Filed: Jul. 30, 1997

[51] Int. Cl.$^6$ .................................................... B32B 29/00
[52] U.S. Cl. .................... 428/421; 204/192.26; 427/164; 427/443.2; 428/422; 428/447; 428/702
[58] Field of Search ........................ 429/162–9; 428/421, 428/422, 447, 450, 202; 204/192.26; 427/443.2

[56] References Cited

U.S. PATENT DOCUMENTS

| | | | |
|---|---|---|---|
| 3,442,664 | 5/1969 | Heine | 106/2 |
| 3,859,320 | 1/1975 | Atherton | 260/448.2 N |
| 4,046,457 | 9/1977 | Land et al. | 350/164 |
| 4,125,673 | 11/1978 | Roth et al. | 428/447 |
| 4,539,061 | 9/1985 | Sagiv | 156/278 |
| 4,687,707 | 8/1987 | Matsuo et al. | 428/336 |
| 4,902,585 | 2/1990 | Ogawa et al. | 428/594 |
| 4,904,525 | 2/1990 | Taniguchi et al. | 428/328 |

(List continued on next page.)

FOREIGN PATENT DOCUMENTS

| | | |
|---|---|---|
| 1324539 | 11/1993 | Canada . |
| 166 363 A2 | 1/1986 | European Pat. Off. . |
| 282188 | 9/1988 | European Pat. Off. . |
| 327 906 A1 | 8/1989 | European Pat. Off. . |
| 352 180 A1 | 1/1990 | European Pat. Off. . |
| 492 545 A2 | 7/1992 | European Pat. Off. . |
| 545 201 A2 | 6/1993 | European Pat. Off. . |
| 564 134 A2 | 10/1993 | European Pat. Off. . |
| 592 463 A1 | 1/1996 | European Pat. Off. . |
| 0 738 771 A1 | 10/1996 | European Pat. Off. . |
| 745 568 A1 | 12/1996 | European Pat. Off. . |
| 749 021 A2 | 12/1996 | European Pat. Off. . |
| 63-296002 | 12/1963 | Japan . |
| 64-86101 | 3/1964 | Japan . |
| 58-126502 | 7/1983 | Japan . |
| 58-172244 | 10/1983 | Japan . |
| 58-213653 | 12/1983 | Japan . |
| 59-026944 | 2/1984 | Japan . |
| 59-115840 | 7/1984 | Japan . |
| 61-018901 | 1/1986 | Japan . |
| 61-040845 | 2/1986 | Japan . |
| 61-247743 | 11/1986 | Japan . |
| 63-021601 | 1/1988 | Japan . |
| 63-228101 | 9/1988 | Japan . |
| 2-019801 | 1/1990 | Japan . |
| 2-116543 | 5/1990 | Japan . |
| 3-266801 | 11/1991 | Japan . |
| 5-196802 | 8/1993 | Japan . |
| 5-254073 | 10/1993 | Japan . |
| 5-341103 | 12/1993 | Japan . |
| 6-011602 | 1/1994 | Japan . |
| 6-025599 | 2/1994 | Japan . |
| 6-082603 | 3/1994 | Japan . |
| 6-082605 | 3/1994 | Japan . |
| 6-103928 | 4/1994 | Japan . |
| 6-279061 | 10/1994 | Japan . |
| 6-324214 | 11/1994 | Japan . |
| 7-081978 | 3/1995 | Japan . |
| 7-287101 | 7/1995 | Japan . |
| 7-287101 | 10/1995 | Japan . |
| 7-300346 | 11/1995 | Japan . |
| 7-315882 | 12/1995 | Japan . |
| 9-127307 | 5/1997 | Japan . |
| 9-133802 | 5/1997 | Japan . |
| 9-36240 | 12/1997 | Japan . |
| 10-026701 | 1/1998 | Japan . |
| 96/31343 | 10/1996 | WIPO . |

OTHER PUBLICATIONS

"Mechanical Properties of Sputtered Films", brochure of CERAC, Inc., Milwaukee, WI, 3 pages, vol. 2, Jul.–Sep. 1992.

A. Ulman, "Monolayers for Organosilicon Derivatives" in *An Introduction to Ultrathin Organic Films: from Langmuir-Blodgett to Self-Assembly;* Academic Press: Boston, pp. 245–253 (1991).

W.J. Smith, *Modern Optical Engineering: The Design for Optical Systems,* 2nd Ed.; McGraw–Hill, Inc.; New York; pp. 125–128 (1990).

I.M. Thomas et al., "A novel perfluorinated AR and protective coating for KDP and other optical materials", *Proc. SPIE–Int. Soc. Opt. Eng.,* 294–3030 (1991).

"Viratec—Clarifying Your Point–of–View with Thin Film Coatings", brochure of Viratec Thin Films, Inc., Faribault, MN, 16 pgs, undated.

S.R. Wasserman et al., "Structure and Reactivity of Alkylsiloxane Monolayers Formed by Reaction of Alkyltrichlorosilanes on Silicon Substrates", *Langmuir,* 5, 1074–1087 (1989).

*Primary Examiner*—Michael Lusignan
*Attorney, Agent, or Firm*—Stephen W. Buckingham

[57] ABSTRACT

An antisoiling coating for an antireflective surface, particularly the outer surface of an antireflective film stack, wherein the antisoiling coating includes a fluorinated siloxane, preferably prepared by applying a coating composition of a fluorinated silane of the following formula:

$$R_f-R^1-SiX_{3-x}R^2_x$$

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1.

39 Claims, No Drawings

U.S. PATENT DOCUMENTS

| | | | |
|---|---|---|---|
| 4,970,099 | 11/1990 | Adams et al. | 428/76 |
| 4,983,459 | 1/1991 | Franz et al. | 428/410 |
| 4,997,684 | 3/1991 | Franz et al. | 427/384 |
| 5,071,709 | 12/1991 | Berquier et al. | 428/447 |
| 5,091,244 | 2/1992 | Biornard | 428/216 |
| 5,105,310 | 4/1992 | Dickey | 359/586 |
| 5,139,879 | 8/1992 | Aharoni et al. | 428/422 |
| 5,147,125 | 9/1992 | Austin | 359/359 |
| 5,150,004 | 9/1992 | Tong et al. | 313/479 |
| 5,153,481 | 10/1992 | Matsuda et al. | 313/479 |
| 5,194,326 | 3/1993 | Arthur et al. | 428/422 X |
| 5,248,915 | 9/1993 | Tong et al. | 313/478 |
| 5,248,916 | 9/1993 | Tong et al. | 313/478 |
| 5,262,557 | 11/1993 | Kishita et al. . | |
| 5,270,858 | 12/1993 | Dickey | 359/586 |
| 5,274,159 | 12/1993 | Pellerite et al. | 556/485 |
| 5,281,893 | 1/1994 | Matsuda et al. | 313/478 |
| 5,284,707 | 2/1994 | Ogawa et al. | 428/333 |
| 5,324,566 | 6/1994 | Ogawa et al. | 428/141 |
| 5,328,768 | 7/1994 | Goodwin | 428/428 |
| 5,368,892 | 11/1994 | Berquier | 427/299 |
| 5,372,874 | 12/1994 | Dickey et al. | 428/216 |
| 5,382,639 | 1/1995 | Moore et al. | 326/243 |
| 5,407,709 | 4/1995 | Ogawa et al. | 427/539 |
| 5,407,733 | 4/1995 | Bjornard et al. | 428/216 |
| 5,437,894 | 8/1995 | Ogawa et al. | 427/535 |
| 5,450,238 | 9/1995 | Bjornard et al. | 359/580 |
| 5,579,162 | 11/1996 | Bjornard et al. . | |
| 5,580,819 | 12/1996 | Li et al. | 427/167 |
| 5,622,784 | 4/1997 | Okaue et al. . | |
| 5,688,864 | 11/1997 | Goodwin | 524/858 |
| 5,744,227 | 4/1998 | Bright et al. . | |

ANTISOILING COATINGS FOR ANTIREFLECTIVE SURFACES AND METHODS OF PREPARATION

BACKGROUND OF THE INVENTION

The transparency of glass or plastic, in the form of doors, windows, lenses, filters, display devices (e.g., display panels) of electronic equipment, and the like, can be impaired by glare or reflection of light. To reduce the amount of glare, for example, on glass or plastic, the surface typically includes a single layer of a metal oxide (such as silicon dioxide), a metal fluoride, a metal nitride, a metal sulfide, or the like. Such coatings function as antireflective coatings.

Glass surfaces have about 4% surface reflection. With the aid of specialized coatings, such as metal oxides, this surface reflection can be reduced to less than about 0.5% in the visible region of the spectrum (400–700 nm). The coatings can be multilayers of dielectric materials deposited in sub-micrometer thicknesses arranged to cause constructive or destructive interference of light waves of different wavelength. Antireflective materials in the visible region typically consist of three or four layers, two of which are of different materials, of alternating high and low index materials. Layers of quarter-wavelength or half-wavelength in optical thickness are typically used in the design of such materials.

Antireflective (AR) film stacks prepared by vacuum sputtering of metal oxide thin films on substrates made of glass or plastic are particularly useful in display devices of electronic equipment. Such metal oxide films are relatively porous and consist of clusters of particles forming a relatively rough profile. Such coatings help reduce glare and reflection. When they are conductive coatings, they also help reduce static discharge and electromagnetic emissions. Thus, the primary application for these coatings is to provide contrast enhancement and antireflective properties to improve the readability of display devices, such as computer monitors.

Sputtered metal oxide antireflective coatings are generally durable and uniform. Also, their optical properties are controllable, which makes them very desirable. They also have very high surface energies and refractive indices, however. The high surface energy of a sputtered metal oxide surface makes it prone to contamination by organic impurities (from sources such as fingerprints). The presence of surface contaminants results in a major degradation of antireflectivity properties of the metal oxide coatings. Furthermore, because of the high refractive indices, surface contamination becomes extremely noticeable to the end-user.

Unfortunately, the high surface energy makes a sputtered metal oxide surface difficult to clean without the use of environmentally undesirable solvent-based cleaners. Furthermore, removal of the surface contaminants can detrimentally affect the antireflective properties of the surface if the cleaning process leaves residue behind. Thus, a need exists for a protective coating on an antireflective surface that is relatively durable, and more resistant to contamination and easier to clean than the antireflective surface itself.

Numerous attempts have been made to provide antisoiling characteristics to an antireflective surface. This has been accomplished by providing antisoiling characteristics to the antireflective coating itself, or by providing an antisoiling coating over the antireflective coating. Such antisoiling overcoatings are typically monolayer films that are free of low molecular weight impurities. Low molecular weight or soft material is believed to be generally undesirable because it can adversely affect the antisoiling characteristics of the treated substrate.

Some conventional methods apply excess coating material that must be removed to maintain the antireflective characteristics of the substrate. Such methods typically require a post-treatment step, such as polishing or solvent washing. In general, such post-treatment steps are undesirable from a manufacturing standpoint because they increase cost, may involve the use of additional solvents, and may increase the chances of scratching the antireflective surface.

SUMMARY OF THE INVENTION

The present invention provides a protective coating on an antireflective surface that is relatively durable, and more resistant to contamination and easier to clean than the antireflective surface itself. The protective coating preferably includes a monolayer of material covalently bound to the antireflective surface of the substrate on which excess coating material is adsorbed that surprisingly need not be removed to maintain the antireflective characteristics of the substrate.

The present invention provides in one embodiment an antireflective article comprising a substrate having an antireflective surface and an antisoiling coating of less than about 100 Angstroms thick deposited thereon. The antisoiling coating comprises a fluorinated siloxane prepared by applying a coating composition (typically a solution) comprising a fluorinated silane of the following formula (I):

$$R_f\text{—}R^1\text{—}SiX_{3-x}R^2_x \qquad (I)$$

wherein:
- $R_f$ is a perfluorinated group optionally containing one or more heteroatoms;
- $R^1$ is a divalent alkylene group, arylene group, or mixture thereof, substituted with one or more heteroatoms or functional groups, containing about 2 to about 16 carbon atoms;
- $R^2$ is a lower alkyl group (i.e., a $(C_1$–$C_4)$alkyl group);
- $X$ is a halide, a lower alkoxy group (i.e., a $(C_1$–$C_4)$alkoxy group, preferably, a methoxy or ethoxy group), or an acyloxy group (i.e., $OC(O)R^3$ wherein $R^3$ is a $(C_1$–$C_4)$ alkyl group); and
- $x$ is 0 or 1.

Preferably, if the X groups include alkoxy groups, at least one acyloxy or halide group is present.

An alternative embodiment of the present invention is an antireflective article comprising a substrate having an antireflective surface and an antisoiling coating deposited thereon. The antisoiling coating comprises a fluorinated siloxane base film of an approximately monolayer thickness on which is adsorbed oligomeric fluorinated siloxane material in an amount that does not substantially change the antireflective characteristics of the antireflective article. The fluorinated siloxane is prepared by applying a coating composition comprising a fluorinated silane of the above formula.

Yet another embodiment of the present invention is an antireflective article comprising a substrate having an antireflective surface and an antisoiling coating deposited thereon; wherein the antisoiling coating is less than about 100 Angstroms thick. The antisoiling coating comprises a fluorinated siloxane base film of an approximately monolayer thickness on which is adsorbed oligomeric fluorinated siloxane material in an amount that does not significantly reduce the antireflective characteristics of the antireflective article.

The present invention also provides methods of applying an antisoiling coating to a substrate having an antireflective surface. In one embodiment, the method comprises treating the antireflective surface with a coating composition comprising a fluorinated silane without subsequent processing. Another method of applying an antisoiling coating to a substrate having an antireflective surface consists essentially of treating the antireflective surface with a coating composition comprising less than about 0.5 weight percent of a fluorinated silane for less than 30 minutes. The fluorinated silane is represented by the above formula (I).

In another method of the present invention, the substrate is immersed in a coating composition comprising less than about 0.5 weight percent of a fluorinated silane for less than about 20 minutes and removing the coated antireflective substrate, wherein upon removal the coated substrate emerges substantially autophobic.

A further method of the invention comprises immersing the substrate in a coating composition comprising a fluorinated silane of the above formula (I); wherein the antisoiling coating formed has a thickness of less than about 100 Angstroms.

Yet another method of the present invention comprises immersing the substrate in a coating composition comprising a fluorinated silane of the above formula (I); wherein the antisoiling coating comprises a fluorinated siloxane base film of an approximately monolayer thickness on which is adsorbed oligomeric fluorinated siloxane material in an amount that does not substantially change the antireflective characteristics of the antireflective article.

Still another method of the invention comprises immersing the substrate in a coating composition comprising less than about 0.5 weight percent of a fluorinated silane for less than about 5 minutes without subsequent processing. The antisoiling coating formed has a thickness of less than about 100 Angstroms and comprises a fluorinated siloxane base film of an approximately monolayer thickness on which is adsorbed oligomeric fluorinated siloxane material in an amount that does not substantially change the antireflective characteristics of the antireflective article.

DETAILED DESCRIPTION OF PREFERRED EMBODIMENTS

Antireflective coatings may include one or more layers of material disposed on a transparent (i.e., light transmissive) substrate, such as glass, quartz, or plastic, including polymethyl methacrylate, polycarbonate, polystyrene, polyvinyl chloride, and the like. The simplest antireflective coating is a single layer of a transparent material having a refractive index less than that of the substrate on which it is disposed. Multilayer antireflective coatings include two or more layers of dielectric material on a substrate, wherein at least one layer has a refractive index higher than the refractive index of the substrate. The multilayer coatings are generally deposited by thermal evaporation or sputtering techniques. Such multilayer coatings are disclosed, for example, in International Publication No. WO 96/31343 (Southwall Technologies Inc.), U.S. Pat. Nos. 5,091,244 (Biornard), 5,105,310 (Dickey), 5,147,125 (Austin), 5,270,858 (Dickey), 5,372,874 (Dickey et al.), 5,407,733 (Dickey), and 5,450,238 (Biornard et al.). They are often referred to as antireflective (AR) film stacks. Such AR film stacks are commercially available, for example, from Viratec Thin Films, Inc., Faribault, Minn.

The antireflective surface can be provided by a wide variety of conventional materials. Preferably, the antireflective surface is provided by a thin metal oxide film, and more preferably, by a thin sputter coated metal oxide film. Herein, "metal oxides" include silicon oxides. Preferably, the metal oxide film on the outermost surface includes silicon oxides ($SiO_x$, typically $SiO_2$), although other suitable materials include $SnO_2$, $TiO_2$, $Nb_2O_5$, $ZnO$, $ZrO_2$, $Ta_2O_5$, $Y_2O_3$, $Al_2O_3$, and ITO (indium tin oxide). Sputter coated metal oxide films are preferred over thermally evaporated films because sputter coated films have higher densities and are harder, smoother, and more stable than thermally evaporated films. Although such sputter coated metal oxide films are relatively porous and consist of clusters of particles with diameters on the order of about 5 nanometers (nm) to about 30 nm as measured by atomic force microscopy, they are sufficiently impermeable to water and gases that can alter their mechanical, electrical, and optical properties.

The present invention provides an antisoiling coating for an antireflective surface, particularly the outer surface of an antireflective film stack, or any surface having thereon an antireflective film, preferably, an antireflective metal oxide film (preferably having one or more metal oxides), and more preferably, a sputter coated antireflective metal oxide film (preferably comprising silicon oxides). An antisoiling coating of the present invention renders a surface more resistant to contamination, as by skin oils from fingerprints, for example. It also renders the surface easier to clean, preferably either with dry wiping or with water. It is also capable of withstanding multiple cleanings. Furthermore, it is relatively easy to apply, and causes little or no disruption of the optical properties of the surface to which it is applied, particularly the antireflective surface of a film stack. That is, an antisoiling coating of the present invention does not significantly increase the reflectivity of the film stack.

An antisoiling coating of the present invention includes a self-assembled fluorinated siloxane film (i.e., a fluorine-containing polyorganosiloxane film), wherein the organic group includes other heteroatoms and/or functional groups. As used herein, "self-assembled" refers to spontaneous adsorption of the active coating ingredient to the antireflective substrate surface. Preferably, the overall coating thickness of the antisoiling coating is greater than a monolayer (which is typically less than about 20 Angstroms thick and greater than about 15 Angstroms thick). That is, preferably, an antisoiling coating of the present invention is at least about 20 Angstroms thick, and more preferably, at least about 30 Angstroms thick. Preferably, it is less than about 100 Angstroms thick, and more preferably, less than about 50 Angstroms thick. An antisoiling coating of the present invention typically includes an approximately monolayer-thickness base film, which is believed to be covalently attached to the antireflective surface of the substrate. On this monolayer base film is adsorbed coating material, which is believed to be relatively low molecular weight oligomeric fluorinated siloxane material (i.e., fluorine-containing polyorganosiloxane material having other heteroatoms and/or functional groups) that is loosely bound to the base film. This oligomeric material can be of varying thickness, depending on process conditions, and can be readily removed by rinsing with an organic solvent. Preferably, however, upon initial formation, the oligomeric fluorinated siloxane material is typically present in an amount that does not substantially change the antireflective characteristics of the antireflective article. Thus, the overall thickness of the antisoiling coating comprises the monolayer base film and oligomeric material.

An antisoiling coating of the present invention can be applied to the antireflective surface of a transparent substrate (i.e., an AR substrate) by a variety of techniques. Preferably, the antireflective surface is treated with a coating composition (typically, a solution) comprising a fluorine-substituted silane (i.e., fluorinated silane) containing an organic moiety with heteroatoms or functional groups. All surfaces or a portion of only one surface of the substrate may be treated, although advantageously only the upper surface of the AR substrate (i.e., the antireflective surface) is coated. Although a wide variety of treatment modes can be used, such as spraying, casting, rolling, or immersing, a preferred treatment mode is to immerse the AR substrate in the coating composition. This method preferably reduces solvent emissions and opportunities for scratching the AR substrate. The coating composition is typically a relatively dilute solution, preferably containing less than about 2.0 weight percent of the fluorinated silane, more preferably, less than about 0.5 weight percent of the fluorinated silane, and most preferably, less than about 0.3 weight percent of the fluorinated silane.

Significantly, the article to be coated is typically contacted with the coating composition (typically, a coating solution) at room temperature (i.e., about 20° C. to about 25° C.) for a relatively short period of time. After a short period of time in contact with the coating composition (as by immersing), the substrate is withdrawn at such a rate that the antireflective surface preferably emerges substantially autophobic (i.e., substantially completely dry with little or no adhering film or droplets of coating composition). Typically, the contact time (i.e., the total time the AR substrate is in contact with the coating composition) is less than about 30 minutes. Preferably, the contact time is less than about 20 minutes, more preferably, less than about 10 minutes, and most preferably, less than about 5 minutes. These contact times are significantly shorter than those conventionally used, which are typically about 30 minutes to about 120 minutes or longer.

Significantly, for preferred embodiments of the present invention, substantially no post-treatment of an antisoiling coating, such as baking at elevated temperatures to cure the coating, polishing, or solvent washing, is necessary to achieve the desired antisoiling characteristics or to restore antireflective properties. In contrast, certain conventional methods often require a heating step after applying an antisoiling coating composition to cure the coating and impart mechanical stability. For certain embodiments of the present invention, however, such as when compounds of formula (I) (below) wherein all the X groups are alkoxy groups are used to prepare the antisoiling coating, a subsequent heat treating step may be required. Certain conventional methods may also require a polishing step or solvent washing step after applying an antisoiling coating composition to remove excess material that can detrimentally affect the antireflective properties of the coating. Although in some applications of the method of the present invention, a stream of nitrogen or dry air may be needed to remove a slight excess of coating composition, preferably, there is no adhering film or droplets of excess coating composition on the AR substrate upon removal from the coating composition. The absence of excess coating composition on the AR substrate is enhanced by using a sufficiently clean substrate and removing the substrate from the coating composition at a sufficiently slow rate (typically, at a rate of about 0.1 centimeter/second to about 2.5 centimeters/second, and preferably, at a rate of about 0.5 centimeter/second).

An antisoiling coating of the present invention provides significant resistance to soiling by common organic contaminants such as fingerprints and solvent-based inks. That is, an antisoiling coating of the present invention shows much less tendency to become soiled by fingerprints, for example, than do AR substrates with no antisoiling coating. Fingerprints that accumulate can be removed easily from an antisoiling coating of the present invention, either with a dry wipe or with water as a cleaner. Such contamination is not easily removed from untreated substrates, for which solvent-based cleaners must be used.

Antisoiling characteristics can be demonstrated by use of an ink challenge test, as disclosed in Example 1 of U.S. Pat. No. 5,382,639 (Moore et al.). In this test, ink is applied to the surface of a coated substrate from a permanent marking pen. Preferably, the coating causes dewetting and beading (i.e., a discontinuous line) or at least a very thin continuous line of the ink, which allows easy cleaning with a dry tissue. That is, preferably, the ink beads up into small discrete droplets that can be wiped away easily with a dry tissue leaving little or no trace of residue and little or no change in the antireflectivity of the substrate. Preferably, this ink challenge can be repeated numerous times with little or no loss of initial performance. For example, the ink challenge test can be repeated at least 15 times with no erosion of performance (i.e., no erosion of the antisoiling characteristics as measured by ink dewetting and beading). In contrast, untreated samples are receptive to the permanent ink, which can typically only be removed by solvent-assisted cleaning.

Significantly, an antisoiling coating of the present invention has little effect on the reflective characteristics of the AR substrate. That is, an antisoiling coating of the present invention does not substantially change the antireflectivity of the antireflective article on which it is coated. For example, on a sample that is coated on only a portion of its surface with an antisoiling coating of the present invention, the boundary between coated and uncoated areas is barely detectable to the naked eye.

Surface reflectance measurements used herein are reported in percentages of the first surface photopic reflectance or the total surface photopic reflectance (i.e., the sum of the first surface plus the second surface reflectance). Herein, first and second surface photopic reflectance are used according to their conventional definitions. First surface reflectance is the result of the interference patterns from the multilayer stack, whereas the second surface reflectance is from the back side of the substrate on which the multilayer stack is built.

As used herein, "photopic" reflectance refers to the reflectance value, reported as a percentage, normalized to the wavelength at which the eye is most sensitive to detect subtle changes in color. This relative sensitivity of the eye to different wavelengths for normal levels of illumination is referred to as photopic vision. This sensitivity occurs in the yellow-green light region of the visible spectrum at 550 nanometers. Thus, the values for photopic reflectance are normalized for a wavelength of 550 nanometers. This is described, for example, in W. J. Smith, *Modern Optical Engineering: The Design of Optical Systems;* McGraw-Hill, Inc.; Second Edition; pages 125–128.

The lower the percentage figure for the first surface (or total) photopic reflectance, the less the tendency of the antireflective surface to produce mirror images. Acceptable antireflective surfaces have total surface photopic reflection values of less than about 1.5 percent specular reflection, preferably, less than about 1.0 percent, and more preferably, less than about 0.5 percent. Below about 0.5 percent specular reflection, it becomes difficult to see the reflected image.

An antireflective surface with a first surface photopic reflectance of greater than about 1.5 percent, typically, up to about 4.0 percent, is generally considered to be of low quality for optical measurements.

Typically, reflectivity measurements of a coated substrate of the present invention show little change (i.e., substantially no change) relative to uncoated controls. Preferably, the difference (increase or decrease) between the first surface reflectance measurement after treatment and the first surface reflectance measurement before treatment is less than about 0.2 percent, more preferably, less than about 0.1 percent, and most preferably, less than about 0.05 percent, upon exposing an antireflective surface to a 0.2 weight percent solution of a fluorinated silane in a 2:1 mixture of "ISOPAR G" and ethyl perfluorobutylether for two minutes at room temperature (i.e., about 20° C. to about 25° C.).

As stated above, an antisoiling coating of the present invention is prepared by applying a coating composition of a fluorinated silane. Preferably, the fluorinated silane includes an organic moiety with heteroatoms or functional groups. More preferably, the fluorinated silane is of the following formula (I):

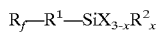

$$R_f\text{—}R^1\text{—}SiX_{3-x}R^2_x \qquad (I)$$

wherein:

R$_f$ is a perfluorinated group optionally containing one or more heteroatoms (typically, oxygen atoms);

the connecting group R$^1$ is a divalent alkylene group, arylene group, or mixture thereof, substituted with one or more heteroatoms (e.g., oxygen, nitrogen, or sulfur), or functional groups (e.g., carbonyl, amido, or sulfonamido), containing about 2 to about 16 carbon atoms (preferably, about 3 to about 10 carbon atoms);

R$^2$ is a lower alkyl group (i.e., a (C$_1$–C$_4$)alkyl group, preferably, a methyl group);

X is a halide, a lower alkoxy group (i.e., a (C$_1$–C$_4$)alkoxy group, preferably, a methoxy or ethoxy group), or an acyloxy group (e.g., OC(O)R$^3$ wherein R$^3$ is a (C$_1$–C$_4$) alkyl group); and x is 0 or 1.

Preferably, x=0 and if the X groups include alkoxy groups, at least one acyloxy or halide group is present. More preferably, X is a halide or an acyloxy. Even more preferably, each X is a halide, and most preferably, each X is chloride.

The perfluorinated group (R$_f$) can include linear, branched, or cyclic structures, that may be saturated or unsaturated. It is preferably a perfluoroalkyl group (C$_n$F$_{2n+1}$) wherein n is about 4 to about 20, more preferably, about 6 to about 12, and most preferably, about 7 to about 10. The divalent R$^1$ group can include linear, branched, or cyclic structures, that may be saturated or unsaturated. Preferably, the divalent R$^1$ group is a linear group containing heteroatoms or functional groups. Typically, suitable fluorinated silanes include a mixture of isomers (e.g., a mixture of compounds containing linear and branched perfluoroalkyl groups). The use of fluorinated silanes containing branched chains without detrimentally affecting the antireflectivity of the coated substrate or the antisoiling characteristics of the coating is surprising as branched chains typically disrupt the packing of the molecules. Mixtures of fluorinated silanes exhibiting different values of n can also be used.

Examples of preferred fluorinated silanes include, but are not limited to, the following: C$_7$F$_{15}$CH$_2$OCH$_2$CH$_2$CH$_2$SiCl$_3$; C$_7$F$_{15}$CH$_2$OCH$_2$CH$_2$CH$_2$Si(CH$_3$)Cl$_2$; C$_7$F$_{15}$CH$_2$OCH$_2$CH$_2$CH$_2$SiCl(OCH$_3$)$_2$; C$_7$F$_{15}$CH$_2$OCH$_2$CH$_2$CH$_2$SiCl$_2$(OC$_2$H$_5$); C$_8$F$_{17}$SO$_2$N(Et)CH$_2$CH$_2$CH$_2$SiCl$_3$; C$_8$F$_{17}$SO$_2$N(Me)CH$_2$CH$_2$CH$_2$Si(CH$_3$)Cl$_2$; and C$_7$F$_{15}$CH$_2$OCH$_2$CH$_2$CH$_2$Si(OAc)$_3$. Although similar compounds containing three alkoxy groups (e.g., —OCH$_3$) on the silicon atom can be used, they are less desirable because they require a subsequent heat treatment step for effective antisoiling characteristics. Mixtures of such compounds can be used if desired.

Such compounds, as well as other compounds of the above formula (I), undergo reaction with the substrate surface to form a siloxane coating that has a strong interaction with the antireflective surface, through the formation of covalent bonds, for example. For the preparation of a durable coating, sufficient water should be present to cause the formation of such an interaction between the fluorinated siloxane coating and the antireflective surface. It is believed that the interaction is formed as a result of hydrolysis of the silane end groups (e.g., chlorosilanes) with residual water, which is either in the coating composition or adsorbed to the substrate surface, for example, and then condensation of the resulting silanol groups on the antireflective surface. Typically, sufficient water is present for the preparation of a durable coating if the coating method is carried out at room temperature in the atmosphere having a relative humidity of about 30% to about 50%.

The solvent system used in the antisoiling coating composition preferably includes one or more solvents that provide a substantially autophobic coating. As used herein, a "substantially autophobic coating" is one that has no adhering film or droplets of excess coating composition on the AR substrate immediately upon removal from the coating composition, or has only a slight amount of the coating composition that can be readily removed by a stream of nitrogen or dry air, for example. More preferably, the solvent system is one that provides a completely autophobic coating. An autophobic coating is formed as a result of the coating composition initially wetting the surface until the fluorinated silane reacts sufficiently with the surface to form a nonwetting surface that repels the remaining coating composition. This eliminates or substantially reduces the need to evaporate a solvent film after coating, which reduces solvent emissions. Furthermore, this prevents or substantially reduces deposition of excess material, which can destroy the antireflectivity characteristics of the AR substrate and must be removed in subsequent processing. Typically, a solvent or mixture of solvents capable of forming an autophobic coating is one with a surface tension of at least about 19 dynes/centimeter.

Preferred solvent(s) are those that are substantially inert (i.e., substantially nonreactive with the fluorinated silane), aprotic, and capable of dissolving the fluorinated silane. Examples of appropriate solvents include, but are not limited to, hydrocarbons, particularly alkanes such as heptane, decane, or paraffinic solvents, fluorinated hydrocarbons, particularly fluorine-substituted alkanes, ethers, particularly alkyl perfluoroalkyl ethers, and hydrochlorofluoro alkanes and ethers. More preferably, the solvent(s) are nonchlorinated and nonflammable. Mixtures of such solvents can be used. Particularly preferred solvents, because of a good balance of solubilization, coating autophobicity, and flammability properties, include mixtures of alkanes (such as the isoparaffinic solvents available under the trade designations "ISOPAR G" and "ISOPAR L" from Exxon Chemical, Baytown, Tex.) with alkyl perfluoroalkyl ethers (such as methyl perfluorobutyl ether and ethyl perfluorobutyl ether).

Although a solvent system that produces a substantially autophobic coating is particularly desirable and advantageous, other solvent systems can be used to prepare an antisoiling coating of the present invention. For example, an alcohol such as isopropanol can be used. However, the resultant coatings may not have antisoiling characteristics as desirable as if an aprotic solvent were used, for example. Furthermore, the resultant coatings may destroy the antireflective properties of an antireflective surface.

A coating composition of the present invention containing a desired solvent system and a fluorinated silane may also include additives, such as HCl scavengers, catalysts (e.g., dibutyltin diacetate), and odor masking agents, provided they do not react with the fluorinated silane. Preferred HCl scavengers include substituted olefinic hydrocarbons such as limonene or pinene. In general, however, such additives are not preferred because they may interfere with recovery and recycling of solvent from used batches of coating composition.

Preferably, the AR substrate should be extremely clean prior to applying the antisoiling coating for optimum coating characteristics, particularly durability, to be obtained. That is, the AR surface of the substrate to be coated should be substantially free of organic contamination prior to coating. A preferred method of removing such contamination prior to coating includes ultrasound cleaning in a solvent bath (e.g., ethanol/chloroform) for preliminary degreasing (if necessary), followed by final cleaning using a gas-phase discharge technique such as air plasma or air corona. The above methods of cleaning glass are more effective for certain types of glass such as TDAR53/G62/NONE and CDAR/G62/SLAR, which are available from Viratec Thin Films, Inc., Fairbault, Minn.

Other methods of cleaning glass such as washing the glass with detergent and/or hot water (about 48°–67° C.) can be effective to obtain very clean surfaces, particularly when the samples are not extremely soiled. Examples of AR surfaces that clean well using detergent and/or hot water include PLASTAR53/POLY/NONE, CCAR/CFL/NONE, CDAR/CFL/CDAR, TDAR53/CFL/NONE, CDAR/G62/SLAR, and TDAR53/G62/NONE, which are available from Viratec Thin Films, Inc. Examples of detergents suitable for such purposes include Alconox from Alconox, Inc., New York, N.Y., RBS-PF concentrate available from Pierce Chemical, Rockford, Ill., and RBS pf concentrate available from Fluka Chemical Corp., Milwaukee, Wis. When washing the glass by hand, a detergent solution of about 0.5 percent to about 2 percent by weight in water is sufficient to clean the AR surface. If washing the AR samples with an automatic glass washer, detergent concentration can be decreased significantly to a range of about 0.001 percent to about 0.2 percent by weight.

The ability of a preferred method of this invention to produce coated substrates of acceptable optical and antisoiling characteristics immediately upon removal from the coating bath, preferably without subsequent processing (e.g., heating, polishing, treating with radiation, or solvent washing to remove excess coating material), is a significant advantage. Thus, a preferred method of the present invention consists essentially of treating the antireflective surface with a coating composition comprising a fluorinated silane. The antireflectivity characteristics of metal oxide stacks are extremely sensitive to surface contamination. Prior to the present invention, typically, only monolayer films have been used as antisoiling treatments for AR substrates. Furthermore, prior to the present invention, only antisoiling coatings that are free of low molecular weight impurities, have been used. In general, preferred coatings prepared by the method of the present invention are thicker than monolayer films due to the presence of oligomeric material adsorbed to an initially deposited monolayer. Significantly, such an antisoiling coating of an oligomeric material of low mechanical integrity does not adversely affect either the optical properties of an AR substrate, or the antisoiling properties of the treated substrate. In addition, the oligomeric material may enhance frictional properties of the treated substrate by acting as a lubricant.

Advantages of the invention are illustrated by the following examples. However, the particular materials and amounts thereof recited in these examples, as well as other conditions and details, are to be interpreted to apply broadly in the art and should not be construed to unduly limit the invention.

EXPERIMENTAL EXAMPLES

Materials

The silane $C_7F_{15}CH_2OCH_2CH_2CH_2SiCl_3$ was prepared as described in Example 1 of U.S. Pat. No. 5,274,159 (Pellerite et al.). The silane $C_8F_{17}SO_2N(C_2H_5)CH_2CH_2CH_2SiCl_3$ was prepared by treatment of $C_8F_{17}SO_2N(C_2H_5)CH_2CH=CH_2$ (which can be obtained as described in Example 1 of U.S. Pat. No. 3,442,664 (Heine)) with $HSiCl_3$ (obtained from Aldrich Chemical Co., Milwaukee, Wis.) in the presence of 50–100 ppm Pt/divinyltetramethyldisiloxane as catalyst (prepared according to methods described in Example 10 of U.S. Pat. No. 3,814,730 (Karstedt)). The triacetoxysilane $C_7F_{15}CH_2OCH_2CH_2CH_2Si(OAc)_3$ was prepared by treating $C_7F_{15}CH_2OCH_2CH_2CH_2SiCl_3$ with acetic anhydride, heating to distill out byproduct acetyl chloride, and vacuum distilling of the product. The silane $C_8F_{17}CH_2CH_2SiCl_3$ was obtained from PCR Inc., Gainesville, Fla. The silane $C_7F_{15}CH_2OCH_2CH_2CH_2Si(CH_3)Cl_2$ was prepared as described in Example 1 of U.S. Pat. No. 5,274,159 (Pellerite et al.) except that $CH_3SiHCl_2$ (obtained from Aldrich Chemical Co., Milwaukee, Wis.) was substituted for trichlorosilane. The silane $C_7F_{15}CH_2OCH_2CH_2CH_2Si(OEt)_3$ was prepared as described in Example 5 of U.S. Pat. No. 5,274,159 (Pellerite et al.), and $C_8F_{17}SO_2N(Et)CH_2CH_2CH_2Si(OMe)_3$ was prepared as described in Example 6 of the same document. Isoparaffinic solvents were obtained under the trade designations "ISOPAR G" and "ISOPAR L" from Exxon Chemical, Baytown, Tex. Ethyl perfluorobutyl ether and methyl perfluorobutyl ether were obtained under the trade designations "HFE 7200" and "HFE 7100," respectively, from 3M Company, St. Paul, Minn.

Antireflective glass samples were obtained from Viratec Thin Films, Faribault, Minn. Silicon wafers were nondevice-quality, P-type (boron-doped) wafers obtained from Silicon Sense, Inc., Nashua, N.H. Unless stated otherwise, substrates were plasma cleaned before coating using a Harrick PDC-3XG plasma cleaner/sterilizer (Harrick Scientific Corp., Ossining, N.Y.) operating at high power. Ellipsometric measurements were made on a Gaertner Model L116A ellipsometer (Gaertner Scientific Corp., Chicago, Ill.) operating at 630 nm.

EXAMPLE 1

Coupons of antireflective glass available from Viratec under the trade designations "CDAR/CFL/CDAR" and "TDAR53/CFL/NONE" were degreased by immersion for several minutes in an ultrasound bath containing a 1:1

(volume/volume) ethanol:chloroform mixture, then exposed to air plasma for at least 10 minutes for final cleaning. They were then immediately dipped in a solution of 0.2 weight percent $C_7F_{15}CH_2OCH_2CH_2CH_2SiCl_3$ in 2:1 (weight/weight) "ISOPAR G" isoparaffin:ethyl perfluorobutyl ether for 2 minutes. Upon withdrawal, the samples emerged completely dry (autophobic), with no need for further processing. That is, no solvent film was present that needed to be removed via evaporation, for example.

Antisoiling characteristics could be demonstrated by application of ink from a black permanent marking pen available under the trade designation "SHARPIE" from Sanford Company. The ink beaded into small discrete droplets which could be wiped away with a dry tissue available under the trade designation "KIMWIPE" from Kimberly-Clark, Roswell, Ga., leaving no trace of residue and no change in the glass antireflectivity properties. This ink challenge could be repeated at least 15 times with no erosion of performance. In contrast, untreated control samples were perfectly receptive to the permanent ink. On such samples, the ink could only be removed by solvent-assisted cleaning.

Comparison of the antireflectivity properties of coated and uncoated (control) samples by inspection with the unaided eye showed little or no difference. Reflectance measurements of the coated and uncoated substrates were obtained with an "EG&G ORTEC" reflectometer probe with a detector interface (model 147A) from Princeton Applied Research, San Diego, Calif. The measurements were made by placing a sample on a table with the external antireflective surface pointed up. Care was taken to maintain the area to be measured clean (i.e., with no dust particles, fingerprints, etc.). The instrument was calibrated using a reference standard, such as a polished glass surface. A glass available under the trade designation "BK-7" from Melles Griot, Irvine, Calif. was used.

The reflectometer probe consists of a head, two fiber optic cables leading into the head (an output or lamp fiber and an input fiber) and three standoffs (or prongs) where the sample is placed perpendicular to the head. The head contains a series of optical elements which focus the light source onto the sample, and then couple the reflected light beam back into the instrument. The beam of light is incident at an angle of 10° onto the sample and is reflected back into the head. The reflected light passes through a small aperture that blocks out the reflection from the back side of the sample, allowing only the light reflected from the front surface to pass. This light is then focused onto the fiber and carried back to the detector interface where the spectrum is measured.

To obtain the reflectance values for samples 1–5 of Table 1 (all of which were prepared as described above), the reflectometer probe was placed directly on top of and perpendicular to the external antireflective surface of the sample. The reflected light from the sample is carried back to the instrument where the signal level across the visible spectrum is measured using a CCD array. To convert the signal level to a reflectance value, the following algorithm is used: the signal level at each wavelength is multiplied by the known percent reflectance value for the reference standard sample, and this value is then divided by the signal level acquired while measuring the reference standard.

As an example, the reflectance of the BK-7 glass at 550 nm is known to be 4.25%. When measuring the BK-7 glass the detector receives 800 counts at 550 nm. When measuring the uncoated side of sample 1, the detector receives 34 counts. Multiply 34 counts by 4.25%, then divide by 800 counts. The result at 550 nm is 0.18% reflection.

To determine the Photopic reflectance (a weighted reflection based on our eye response), there are three values called the tristimulus values X, Y and Z that must be determined. These values are calculated by summing or integrating the reflection values over the visible spectrum (400–800 nm) weighted by an illuminate value D65 and normalization constant.

TABLE 1

| Sample No. | Percent of First Surface Reflectance Before Treatment | Percent of First Surface Reflectance After Treatment |
| --- | --- | --- |
| 1 | 0.18 | 0.22 |
| 2 | 0.20 | 0.20 |
| 3 | 0.20 | 0.21 |
| 4 | 0.22 | 0.22 |
| 5 | 0.22 | 0.21 |

The data in Table 1 shows that the average reflectance change (i.e., difference between before and after treatment) is no greater than 0.04 percent. It is unlikely that this minor difference would be detectable to the human eye. Comparison of the antireflectivity properties of coated and uncoated (control) samples by either inspection with the unaided eye or reflectometry measurements showed little or no difference. Thus, deposition of the fluorochemical film did not significantly affect the antireflective properties of the glass, while it improved the antisoiling characteristics, as demonstrated by the ink challenge test.

EXAMPLE 2

The coating experiments described in Example 1 were repeated using a solution of 0.2 weight percent $C_7F_{15}CH_2OCH_2CH_2CH_2SiCl_3$ in "ISOPAR G" isoparaffin or "ISOPAR L" isoparaffin. Identical results to those obtained in Example 1 were obtained for each of these solvents with respect to retention of antireflectivity properties of the coated glass, and antisoiling properties of the coated glass as measured in the ink challenge test described in Example 1.

EXAMPLE 3

Coupons of antireflective glass obtained from Viratec under the trade designation "CDAR/CFL/CDAR" were degreased by immersion for several minutes in an ultrasound bath containing a 1:1 (volume/volume) ethanol:chloroform mixture, then exposed to air plasma for at least 10 minutes for final cleaning. The cleaned samples were dipped immediately for 2 or 5 minutes in a solution of 0.16 weight percent $C_8F_{17}SO_2N(C_2H_5)CH_2CH_2CH_2SiCl_3$ in 2:1 (weight/weight) "ISOPAR G" isoparaffin:ethyl perfluorobutyl ether. Upon withdrawal, the samples emerged completely dry (autophobic), with no need for further processing (e.g., no evaporation of a solvent film was required). When challenged with black permanent ink as described in Example 1, the ink beaded into small discrete droplets that could be wiped away with dry "KIMWIPE" tissue, leaving no trace of residue and no change in the antireflectivity properties of the glass.

Reflectance measurements of the coated and uncoated substrates, prepared as described above, were obtained as described in Example 1. Results from these measurements, before and after coating, are shown in Table 2, below.

TABLE 2

| Sample No. | Percent of First Surface Reflectance Before Treatment | Percent of First Surface Reflectance After Treatment |
| --- | --- | --- |
| 11 | 0.18 | 0.22 |
| 12 | 0.18 | 0.23 |
| 13 | 0.17 | 0.22 |
| 14 | 0.17 | 0.23 |
| 15 | 0.16 | 0.21 |

The data in Table 2 shows that the average reflectance change (i.e., difference between before and after treatment) is no greater than 0.06 percent. It is unlikely that this minor difference would be detectable to the human eye. Comparison of the antireflectivity properties of coated and uncoated (control) samples by either inspection with the unaided eye or reflectometry measurements showed little or no difference. Thus, deposition of the fluorochemical film did not significantly affect the antireflective properties of the glass, while it improved the antisoiling characteristics, as demonstrated by the ink challenge test.

EXAMPLE 4

Pieces of silicon wafers were cleaned by immersion for several minutes in an ultrasound bath containing a 1:1 (volume/volume) ethanol:chloroform mixture, then irradiated for several minutes in a UV/ozone chamber. The optical constants (n and k) were measured by ellipsometry, and the samples were put back into the UV/ozone chamber for 1 minute followed by immediate immersing in a solution of 0.2 weight percent $C_7F_{15}CH_2OCH_2CH_2CH_2SiCl_3$ in 2:1 (weight/weight) "ISOPAR G" isoparaffin:ethyl perfluorobutyl ether for 2, 5, or 24 minutes. Upon withdrawal, the samples emerged completely dry (autophobic). The thickness of the coating was measured by ellipsometry using a two-layer model, the optical constants (n and k) determined before coating, and an assumed value of 1.35 for the refractive index of the film. The silicon wafer samples were then soaked in methyl perfluorobutyl ether for 20 minutes, and the film thickness measurements were repeated. Results from these measurements, both before and after rinsing, are shown in Table 3, below.

TABLE 3

| Dip Time (minutes) | Film Thickness Before Rinsing (Angstroms) | Film Thickness After Rinsing (Angstroms) |
| --- | --- | --- |
| 2 | 24.2 | 18.4 |
| 5 | 27.1 | 19.3 |
| 24 | 48.0 | 17.6 |

These data show that the films of this invention are significantly thicker than one monolayer. However, upon rinsing with a solvent, films of approximately monolayer thickness can be obtained, independent of dip time, as a result of washing away the loosely bound oligomeric material. This suggests that the coatings of this invention include a first layer, approximately one monolayer thick, covalently bound to the substrate, and a second layer of loosely bound oligomeric material, the thickness of which depends on processing conditions (dipping time, in this example).

EXAMPLE 5

Three coating solutions were prepared using 0.2 weight percent silane in 2:1 (weight/weight) "ISOPAR G" isoparaffin:ethyl perfluorobutyl ether. Silanes used are shown in Table 4, below.

TABLE 4

| Sample | Silane |
| --- | --- |
| 1 | $C_7F_{15}CH_2OCH_2CH_2CH_2SiCl_3$ |
| 2 (Comparative) | $C_8F_{17}CH_2CH_2SiCl_3$ |
| 3 | $C_8F_{17}SO_2N(C_2H_5)CH_2CH_2CH_2SiCl_3$ |

The coating solutions were transferred into 4-ounce screw-top jars and allowed to stand at room temperature for two days. Inspection of the solutions after this period showed that those prepared from silanes 1 and 3 were still clear, while that from comparative silane 2 was noticeably hazy. This haziness is believed to be due to precipitation of oligomers as a result of hydrolysis of the silane by adventitious moisture. In general, oligomer precipitation is undesirable because the precipitated particulate can adsorb on the antireflective substrate during dip coating. This can result in loss of coating autophobicity and loss of substrate antireflective characteristics, yielding substrates requiring further processing. Thus, silanes 1 and 3 produce more stable coating compositions than comparative silane 2.

EXAMPLE 6

Coupons of antireflective glass obtained from Viratec under the trade designation "CDAR/CFL/CDAR" were degreased by immersion for several minutes in an ultrasound bath containing a 1:1 (volume/volume) ethanol:chloroform mixture, then exposed to air plasma for at least 10 minutes for final cleaning. They were then immediately dipped in a solution of 0.2 weight percent $C_7F_{15}CH_2OCH_2CH_2CH_2Si(OAc)_3$ in 2:1 (weight/weight) "ISOPAR G" isoparaffin:ethyl perfluorobutyl ether for 2 minutes. Upon withdrawal from the coating bath, the samples emerged partially autophobic, but excess solution could be blown off the surface easily under a stream of nitrogen. When challenged with black permanent ink as described in Example 1, the ink formed small discrete droplets that could be wiped away with a dry "KIMWIPE" tissue, leaving no trace of residue and no change in the glass antireflectivity properties by visual inspection of the sample and comparison with a sample of the uncoated glass.

EXAMPLE 7

Coupons of antireflective glass obtained from Viratec under the trade designation "CDAR/CFL/CDAR" were cleaned as described in Example 1 and allowed to stand in air for 10 minutes before dipping in a solution of 0.3 weight percent $C_7F_{15}CH_2OCH_2CH_2CH_2Si(CH_3)Cl_2$ in "ISOPAR G" for 5 minutes. Upon withdrawal from the coating bath, the samples emerged completely autophobic. When challenged with black permanent ink as described in Example 1, the ink formed small discrete droplets that could be wiped away with a dry "KIMWIPE" tissue, leaving no trace of residue and no change in the glass antireflectivity properties by visual inspection of the sample and comparison with a sample of the uncoated glass.

EXAMPLE 8

Coupons of antireflective glass obtained from Viratec under the trade designation "TDAR53/G62/NONE" were cleaned by wiping the surface with a "KIMWIPE" tissue wetted with a dilute solution of distilled water and Alconox detergent, obtained from Alconox, Inc., NY, N.Y., and rinsing with distilled water. They were then dried immediately with a dry "KIMWIPE" tissue to avoid the formation of water spots. The coupons were then immediately subjected to a Corona discharge of a total energy density of approximately 28.3 Joules/$Cm^2$. The coupons were then dipped in a solution of 0.3 weight percent $C_7F_{15}CH_2OCH_2CH_2CH_2SiCl_3$ in "ISOPAR G" isoparaffin for 2 minutes (10 samples) or 3 minutes (10 samples). Upon withdrawal from the coating bath, the samples emerged partially autophobic, but excess solution could be blown off the surface easily under a stream of nitrogen.

The 20 samples were then tested for durability per Military Specification MIL-C-48497A. Briefly, this involved rubbing the samples with 100 passes using cheese cloth and 2.5 pounds of force. A drop of 35 dynes/cm solution, obtained from Accu-Dyne, Diversified Enterprises, East Wallingford, Vt., was placed next to the area rubbed. The droplet was allowed to roll across the rubbed area. If it maintained its initial shape when it crossed the rubbed area, it passed the test. Of the 20 samples, 19 passed this test as the droplet did not deform. For one of the samples that was treated with the coating composition for 3 minutes, the droplet became slightly deformed as it crossed the rubbed area. The 20 samples were then challenged in the rubbed areas with 1–3 cycles of black permanent ink. The ink formed small discrete droplets that could be wiped away with a dry "KIMWIPE" tissue, leaving no trace of residue. These results indicate that the antisoiling coating of the present invention is very durable.

Reflectance measurements for various of these samples were obtained using a Hunter Lab Universal V3.1 Spectrophotometer, obtained from Hunter Lab, Reston, Va. The measurements are total reflectance measurements (i.e., the sum of the reflectance measurements for the first and the second antireflective surfaces) determined at a wavelength of 550 nm using a 1931 CIE Chromaticity diagram with a 10 degree observer and illuminate D65. Total reflectance was measured per the Hunter Lab Universal V3.1 Spectrophotometer's guidelines specified in the manual for the instrument. The reflectance values are presented in Table 5, below.

TABLE 5

| Dip Time | Percent of Total Reflectance Before Treatment | Percent of Total Reflectance After Treatment |
| --- | --- | --- |
| 2 min. | 0.77 | 0.70 |
| 2 min. | 0.68 | 0.75 |
| 3 min. | 0.76 | 0.80 |
| 3 min. | 0.75 | 0.79 |
| 3 min. | 0.70 | 0.72 |
| 3 min. | 0.70 | 0.76 |

The data in Table 5 shows that the average total reflectance change (i.e., difference between before and after treatment) is no greater than 0.07 percent. It is unlikely that this minor difference would be detectable to the human eye. These values are typically higher than the first surface reflectance measurements because the total reflectance takes into account the second surface, which, for these samples, was not an antireflective surface; rather, the second surface was a nonantireflective glass with a 4 percent reflectivity. Thus, even with a nonantireflective second surface, deposition of the fluorochemical film did not significantly affect the antireflective characteristics of the glass, while it did improve the antisoiling characteristics, as demonstrated by the ink challenge test.

EXAMPLE 9

Coupons of circular polarizing laminates were prepared by sandwiching a circular polarized film from PolarVision, Torrence, Calif., between AR glass obtained from Viratec under the trade designation "PATRIOT" and plain $SiO_2$ glass obtained from Viratec using polyvinyl butyral adhesive. They were cleaned by wiping the AR surface with a "KIMWIPE" tissue wetted with a dilute solution of distilled water and Alconox detergent, obtained from Alconox, Inc., NY, N.Y., and rinsing with distilled water. They were then dried immediately with a dry "KIMWIPE" tissue to avoid the formation of water spots. After about 5 minutes, the coupons were dipped in a solution of 0.3 weight percent $C_7F_{15}CH_2OCH_2CH_2CH_2SiCl_3$ in "ISOPAR G" isoparaffin for 2 minutes (10 samples) or 3 minutes (10 samples). Upon withdrawal from the coating bath, the samples emerged either completely autophobic or partially autophobic, but excess solution could be blown off the surface easily under a stream of nitrogen.

The 20 samples were then tested for durability per Military Specification MIL-C-48497A as described in Example 8. Of the 20 samples, 19 passed this test as the droplet did not deform. For one of the samples that was treated with the coating composition for 2 minutes, the droplet became slightly deformed as it crossed the rubbed area. These results indicate that the antisoiling coating of the present invention is generally very durable.

Comparison of the antireflectivity properties of coated and uncoated (control) samples by inspection with the unaided eye showed little or no difference. Thus, deposition of the fluorochemical film did not significantly affect the antireflective properties of the glass, while it improved the antisoiling characteristics, as demonstrated by the ink challenge test.

The 20 samples were then challenged in the rubbed areas with black permanent ink as described in Example 1. Of the 20 samples, 19 passed this test as the ink formed small discrete droplets that could be wiped away, leaving no trace of residue. For one sample, the ink exhibited partial dewetting.

EXAMPLE 10

A mixture of 1.15 grams $C_7F_{15}CH_2OCH_2CH_2CH_2SiCl_3$ and 2.40 grams $C_7F_{15}CH_2OCH_2CH_2CH_2Si(OEt)_3$ was prepared in a screw-top vial and allowed to stand at room temperature for five days. Analysis of the resulting mixture by Si-29 NMR spectroscopy showed it to consist of 84 mole percent $C_7F_{15}CH_2OCH_2CH_2CH_2SiCl(OEt)_2$, 8 mole percent $C_7F_{15}CH_2OCH_2CH_2CH_2SiCl_2(OEt)$, and 8 mole percent $C_7F_{15}CH_2OCH_2CH_2CH_2Si(OEt)_3$. A coating solution was prepared by diluting this mixture to 0.3 weight percent in "ISOPAR G" isoparaffin.

Coupons of antireflective glass obtained from Viratec under the trade designation "TDAR53/G62/NONE" were cleaned as described in Example 1, then dipped in the above coating composition for 2 or 3 minutes. Upon withdrawal from the coating bath, the samples emerged completely autophobic. When challenged with black permanent ink as described in Example 1, the ink formed small discrete droplets that could be wiped away with a dry "KIMWIPE" tissue, leaving no trace of residue and no change in the glass antireflectivity properties by visual inspection of the sample and comparison with a sample of the uncoated glass. Furthermore, the ink challenge/dry wipe test could be repeated for 15 cycles with no deterioration of the initial ink beading performance. When the above experiment was repeated using a solution of 0.3 weight percent $C_7F_{15}CH_2OCH_2CH_2CH_2Si(OEt)_3$ in "ISOPAR G" isoparaffin instead of the above mixture, the resulting treated glass coupons showed no ink beading in the ink challenge test.

EXAMPLE 11

Coupons of antireflective glass obtained from Viratec under the trade designation "TDAR53/G62/NONE" were cleaned as described in Example 1, then dipped for 10 minutes in a solution of 0.3 weight percent $C_8F_{17}SO_2N(Et)CH_2CH_2CH_2Si(OMe)_3$ in 2:1 (weight/weight) "ISOPAR G" isoparaffin:ethyl perfluorobutyl ether. Upon withdrawal from the coating bath, the samples emerged only partially autophobic; droplets of excess coating solution were removed under a nitrogen stream. The samples were then placed in a forced-air oven at 100° C. for 10 minutes, removed, and allowed to cool to room temperature. When challenged with black permanent ink as described in Example 1, the ink exhibited partial dewetting into a thin line which could be wiped away with a dry "KIMWIPE" tissue, leaving no trace of residue and no change in the glass antireflective properties by visual inspection of the sample and comparison with a sample of the uncoated glass. This behavior continued through a total of 14 test cycles. After 15 ink challenge/dry wipe cycles, the ink no longer showed beading but could still be removed by dry wiping. Identical results were obtained when this experiment was repeated using an identical coating composition to which 2 weight percent (based on silane) dibutyltin diacetate had been added.

EXAMPLE 12

A coupon of antireflective glass obtained from Viratec under the trade designation "TDAR53/G62/NONE" was cleaned as described in Example 1, then dipped quickly in a solution of 0.1 weight percent $C_8F_{17}SO_2N(Et)CH_2CH_2CH_2Si(OMe)_3$ in isopropanol. The sample emerged bearing a wet film; the solvent was allowed to flash off, then the sample was placed in a forced-air oven at 100° C. for 10 minutes. Upon removal and cooling to room temperature, the sample was tested with black permanent ink/dry wipe cycling as described in Example 1. Cycles 1 and 2 gave dewetting of the ink into discrete droplets that could be wiped away with a dry "KIMWIPE" tissue, leaving no trace of residue and no change in the glass antireflectivity properties by visual inspection of the sample and comparison with a sample of the uncoated glass. Cycles 3 through 7 gave no ink dewetting, but the ink was still removed by dry wiping. After cycle 7, the ink was not readily removable by dry wiping.

COMPARATIVE EXAMPLE 1

Coupons of antireflective glass obtained from Viratec under the trade designation "CDAR/CFL/CDAR" were cleaned as described in Example 1 and dipped quickly (with a contact time of less than about 1 second) in a solution of 2.5 weight percent $C_8F_{17}CH_2CH_2SiCl_3$ in FC-77 (a perfluorinated liquid obtained from 3M Company, St. Paul, Minn.). The samples emerged bearing a solvent film; the solvent flashed off to yield an excessively thick film of fluorinated siloxane, which destroyed the antireflective properties of the glass substrate as evidenced by visual inspection of the sample and comparison with a sample of the uncoated glass. This example is similar to the coating method described in U.S. Pat. No. 5,328,768 (Franz et al.).

COMPARATIVE EXAMPLE 2

A solution of 2 weight percent $C_8F_{17}CH_2CH_2SiCl_3$ was prepared in a solvent consisting of 80 weight percent hexadecane, 12 weight percent carbon tetrachloride, and 8 weight percent chloroform. A coupon of antireflective glass obtained from Viratec under the trade designation "TDAR53/CFL/NONE" was cleaned according to the procedure in Example 1 and dipped in this solution for 1 hour at room temperature. Upon withdrawal, the sample did not emerge autophobic, and showed an excessively thick film of fluorinated siloxane, which destroyed the antireflective properties of the glass substrate, as evidenced by visual inspection of the sample and comparison with a sample of uncoated glass. This example is similar to the coating method described in U.S. Pat. No. 5,284,707 (Ogawa et al.).

COMPARATIVE EXAMPLE 3

Coupons of antireflective glass obtained from Viratec under the trade designation "CDAR/CFL/CDAR" were degreased by immersion for several minutes in an ultrasound bath containing a 1:1 (volume/volume) ethanol:chloroform mixture, then exposed to air plasma for at least 10 minutes for final cleaning. The cleaned samples were dipped immediately for 2 or 5 minutes in a solution of 0.6 weight percent $C_8F_{17}CH_2CH_2SiCl_3$ in 2:1 (weight/weight) ISOPAR G:ethyl perfluorobutyl ether. Upon withdrawal, the samples emerged partially autophobic. The droplets of excess coating composition were removed using a stream of nitrogen. When challenged with black permanent ink as described in Example 1, the samples showed only partial dewetting, forming a line rather than discrete droplets on the first cycle. The samples were then wiped by buffing with a dry "KIMWIPE" tissue. Subsequent ink challenge/dry wipe cycles gave dewetting of the ink into discrete droplets which could be wiped away with a dry "KIMWIPE" tissue. Thus, buffing (as with a "KIMWIPE" tissue) or further processing of this film was required after removal from the coating bath in order to obtain ultimate performance.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. An antireflective article comprising a substrate having an antireflective surface and an antisoiling coating of less than about 100 Angstroms thick deposited thereon; wherein the antisoiling coating comprises a fluorinated siloxane prepared by applying a coating composition comprising a fluorinated silane of the following formula:

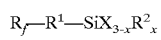

wherein:
$R_f$ is a perfluorinated group optionally containing one or more heteroatoms;
$R^1$ is a divalent alkylene group, arylene group, or mixture thereof, substituted with one or more heteroatoms or functional groups, containing about 2 to about 16 carbon atoms;
$R^2$ is a lower alkyl group;
X is a halide, a lower alkoxy group, or an acyloxy group; and
x is 0 or 1.

2. The antireflective article of claim 1 wherein the antireflective surface comprises a metal oxide film having one or more metal oxides.

3. The antireflective article of claim 2 wherein the antireflective surface comprises a sputter coated metal oxide film.

4. The antireflective article of claim 3 wherein the antisoiling coating is at least about 20 Angstroms thick.

5. The antireflective article of claim 1 wherein the antisoiling coating comprises a fluorinated siloxane base film of an approximately monolayer thickness on which is adsorbed oligomeric fluorinated siloxane material in an amount that does not significantly reduce the antireflective characteristics of the antireflective article.

6. The antireflective article of claim 1 which has a first surface antireflectivity that is less than about 0.2 percent different than that of the same article without the antisoiling coating.

7. The antireflective article of claim 1 wherein the coating is prepared by applying a coating composition comprising a fluorinated silane wherein each X is a halide.

8. The antireflective article of claim 1 wherein the coating is prepared by applying a coating composition comprising a fluorinated silane wherein $R_f$ is a perfluoroalkyl group of the formula $C_nF_{2n+1}$ wherein n is about 4 to about 20.

9. The antireflective article of claim 8 wherein the coating is prepared by applying a coating composition comprising a fluorinated silane wherein $R_f$ is a perfluoroalkyl group of the formula $C_nF_{2n+1}$ wherein n is about 7 to about 10.

10. The antireflective article of claim 1 wherein the coating is prepared by applying a coating composition comprising a fluorinated silane selected from the group of $C_7F_{15}CH_2OCH_2CH_2CH_2SiCl_3$, $C_7F_{15}CH_2OCH_2CH_2CH_2Si(CH_3)Cl_2$, $C_7F_{15}CH_2OCH_2CH_2CH_2SiCl(OCH_3)_2$, $C_7F_{15}CH_2OCH_2CH_2CH_2SiCl_2(OC_2H_5)$, $C_8F_{17}SO_2N(Et)CH_2CH_2CH_2SiCl_3$, $C_8F_{17}SO_2N(Me)CH_2CH_2CH_2Si(CH_3)Cl_2$, and $C_7F_{15}CH_2OCH_2CH_2CH_2Si(OAc)_3$, and mixtures thereof.

11. An antireflective article comprising a substrate having an antireflective surface and an antisoiling coating deposited thereon; wherein the antisoiling coating comprises a fluorinated siloxane base film of an approximately monolayer thickness on which is adsorbed oligomeric fluorinated siloxane material in an amount that does not substantially change the antireflective characteristics of the antireflective article; wherein the fluorinated siloxane is prepared by applying a coating composition comprising a fluorinated silane of the following formula:

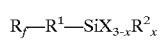

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1.

12. The antireflective article of claim 11 wherein the antireflective surface comprises a metal oxide film having one or more metal oxides.

13. The antireflective article of claim 12 wherein the antireflective surface comprises a sputter coated metal oxide film.

14. The antireflective article of claim 11 which has a first surface antireflectivity that is less than about 0.2 percent different than that of the same article without the antisoiling coating.

15. An antireflective article comprising a substrate having an antireflective surface and an antisoiling coating deposited thereon; wherein the antisoiling coating is less than about 100 Angstroms thick and comprises a fluorinated siloxane base film of an approximately monolayer thickness on which is adsorbed oligomeric fluorinated siloxane material in an amount that does not significantly reduce the antireflective characteristics of the antireflective article.

16. A method of applying an antisoiling coating to a substrate having an antireflective surface, the method comprising treating the antireflective surface with a coating composition comprising a fluorinated silane without subsequent processing; wherein the fluorinated silane has the following formula:

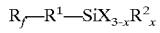

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1.

17. The method of claim 16 wherein the coating is prepared by applying a coating composition comprising a fluorinated silane selected from the group of $C_7F_{15}CH_2OCH_2CH_2CH_2SiCl_3$, $C_7F_{15}CH_2OCH_2CH_2CH_2Si(CH_3)Cl_2$, $C_7F_{15}CH_2OCH_2CH_2CH_2SiCl(OCH_3)_2$, $C_7F_{15}CH_2OCH_2CH_2CH_2SiCl_2(OC_2H_5)$, $C_8F_{17}SO_2N(Et)CH_2CH_2CH_2SiCl_3$, $C_8F_{17}SO_2N(Me)CH_2CH_2CH_2Si(CH_3)Cl_2$, and $C_7F_{15}CH_2OCH_2CH_2CH_2Si(OAc)_3$, and mixtures thereof.

18. The method of claim 16 wherein the antisoiling coating formed comprises a fluorinated siloxane base film of an approximately monolayer thickness on which is adsorbed oligomeric fluorinated siloxane material.

19. The method of claim 16 wherein the antisoiling coating formed is less than about 100 Angstroms thick.

20. The method of claim 19 wherein the antisoiling coating formed is at least about 20 Angstroms thick.

21. The method of claim 16 wherein the step of treating is carried out at room temperature.

22. The method of claim 16 wherein the coating composition comprising the fluorinated silane comprises less than about 2.0 weight percent of the fluorinated silane.

23. The method of claim 16 wherein the antireflective substrate is treated with a coating composition comprising a fluorinated silane for less than 30 minutes.

24. The method of claim 23 wherein the antireflective substrate is treated with a coating composition comprising a fluorinated silane for less than about 10 minutes.

25. The method of claim 16 wherein the step of treating comprises immersing the substrate in the coating composition comprising the fluorinated silane and removing the coated antireflective substrate, wherein upon removal the coated substrate emerges substantially autophobic.

26. The method of claim 16 wherein the coating composition comprising the fluorinated silane further comprises a nonchlorinated solvent.

27. The method of claim 26 wherein the solvent is selected from the group of an alkane, a fluorinated alkane, an alkyl perfluoroalkyl ether, and mixtures thereof.

28. The method of claim 27 wherein the solvent is a mixture of a paraffinic solvent and an alkyl perfluoroalkyl ether.

29. A method of applying an antisoiling coating to a substrate having an antireflective surface, the method consisting essentially of treating the antireflective surface with a coating composition comprising less than about 0.5 weight percent of a fluorinated silane for less than 30 minutes; wherein the fluorinated silane has the following formula:

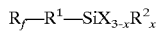

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1.

30. The method of claim 29 wherein the step of treating comprises immersing the substrate in the coating composition comprising the fluorinated silane and removing the coated antireflective substrate, wherein upon removal the coated substrate emerges substantially autophobic.

31. A method of applying an antisoiling coating to a substrate having an antireflective surface, the method comprising immersing the substrate in a coating composition comprising less than about 0.5 weight percent of a fluorinated silane for less than about 20 minutes and removing the coated antireflective substrate, wherein upon removal the coated substrate emerges substantially autophobic.

32. A method of applying an antisoiling coating to a substrate having an antireflective surface, the method comprising immersing the substrate in a coating composition comprising a fluorinated silane of the following formula:

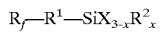

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1;

wherein the antisoiling coating formed has a thickness of less than about 100 Angstroms.

33. The method of claim 32 wherein the antireflective surface comprises a metal oxide film having one or more metal oxides.

34. The method of claim 33 wherein the antireflective surface comprises a sputter coated metal oxide film.

35. An antireflective article made by the method of claim 32.

36. A method of applying an antisoiling coating to a substrate having an antireflective surface, the method comprising immersing the substrate in a coating composition comprising a fluorinated silane of the following formula:

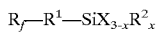

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1;

wherein the antisoiling coating comprises a fluorinated siloxane base film of an approximately monolayer thickness on which is adsorbed oligomeric fluorinated siloxane material in an amount that does not substantially change the antireflective characteristics of the antireflective article.

37. An antireflective article made by the method of claim 36.

38. A method of applying an antisoiling coating to a substrate having an antireflective surface, the method comprises immersing the substrate in a coating composition comprising less than about 0.5 weight percent of a fluorinated silane for less than about 5 minutes without subsequent processing; wherein the fluorinated silane is of the following formula:

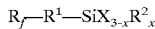

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1;

wherein the antisoiling coating formed has a thickness of less than about 100 Angstroms and comprises a fluorinated siloxane base film of an approximately monolayer thickness on which is adsorbed oligomeric fluorinated siloxane material in an amount that does not substantially change the antireflective characteristics of the antireflective article.

39. An antireflective article made by the method of claim 38.

* * * * *

UNITED STATES PATENT AND TRADEMARK OFFICE
CERTIFICATE OF CORRECTION

PATENT NO. : 5,851,674                         Page 1 of 1
DATED      : December 22, 1998
INVENTOR(S): Mark J. Pellerite, Judith M. Invie, Dong-Wei Zhu It is certified that error appears in the above-identified patent and that said Letters Patent is hereby corrected as shown below:

<u>Title page,</u>
OTHER PUBLICATION, "3030" should read -- 303 --.
FOREIGN PATENT DOCUMENTS, "592 463 A1" should read -- 692 463 A1 --.

Signed and Sealed this

Twenty-fifth Day of December, 2001

Attest:

Attesting Officer

JAMES E. ROGAN
Director of the United States Patent and Trademark Office

(12) EX PARTE REEXAMINATION CERTIFICATE (5466th)
United States Patent
Pellerite et al.

(10) Number: US 5,851,674 C1
(45) Certificate Issued: Aug. 1, 2006

(54) ANTISOILING COATINGS FOR ANTIREFLECTIVE SURFACES AND METHODS OF PREPARATION

(75) Inventors: Mark J. Pellerite, St. Paul, MN (US); Judith M. Invie, St. Paul, MN (US); Dong-Wei Zhu, St. Paul, MN (US)

(73) Assignee: Minnesota Mining and Manufacturing Company, St. Paul, MN (US)

Reexamination Request:
No. 90/006,769, Aug. 29, 2003

Reexamination Certificate for:
Patent No.: 5,851,674
Issued: Dec. 22, 1998
Appl. No.: 08/902,666
Filed: Jul. 30, 1997

Certificate of Correction issued Dec. 25, 2001.

(51) Int. Cl.
*B32B 29/00* (2006.01)
*B05D 5/00* (2006.01)
*G02B 1/00* (2006.01)
*G02B 1/10* (2006.01)

(52) U.S. Cl. .......... 428/421; 428/422; 428/446; 428/447; 428/702; 427/164; 427/169; 427/419.5; 427/430.1; 427/443.2; 204/192.26

(58) Field of Classification Search ............. 427/162, 427/164, 165, 168, 169, 402, 419.5, 430.1, 427/443.2; 428/446, 447, 421, 422; 359/580, 359/581, 582
See application file for complete search history.

(56) References Cited

U.S. PATENT DOCUMENTS

| | | | |
|---|---|---|---|
| 2,803,615 A | 8/1957 | Ahlbrecht et al. |
| 2,839,513 A | 6/1958 | Ahlbrecht et al. |
| 2,995,542 A | 8/1961 | Brown |
| 3,132,117 A | 5/1964 | Schmidt |
| 3,356,628 A | 12/1967 | Smith et al. |
| 3,442,664 A | 5/1969 | Heine |
| 3,492,374 A | 1/1970 | LeBleu et al. |
| 3,794,672 A | 2/1974 | Kim |
| 3,798,251 A | 3/1974 | Meiller |
| 3,809,783 A | 5/1974 | Pittman et al. |
| 3,810,874 A | 5/1974 | Mitsch et al. |
| 3,814,741 A | 6/1974 | Caporiccio et al. |
| 3,859,320 A | 1/1975 | Atherton |
| 3,950,588 A | 4/1976 | McDougal |
| 3,992,374 A | 11/1976 | Rufer et al. |
| 4,046,457 A | 9/1977 | Land et al. |
| 4,085,137 A | 4/1978 | Mitsch et al. |
| 4,125,673 A | 11/1978 | Roth et al. |
| 4,211,823 A | 7/1980 | Suzuki et al. |
| 4,338,454 A | 7/1982 | Wesson et al. |
| 4,478,873 A | 10/1984 | Masso et al. |
| 4,499,146 A | 2/1985 | Piacenti et al. |
| 4,539,061 A | 9/1985 | Sagiv |
| 4,687,707 A | 8/1987 | Matsuo et al. |
| 4,745,009 A | 5/1988 | Piacenti et al. |
| 4,786,544 A | 11/1988 | Saito |
| 4,849,305 A | 7/1989 | Yanagisawa |
| 4,902,585 A | 2/1990 | Ogawa et al. |
| 4,904,525 A | 2/1990 | Taniguchi et al. |
| 4,927,950 A | 5/1990 | Hisamoto et al. |

(Continued)

FOREIGN PATENT DOCUMENTS

| | | |
|---|---|---|
| AU | 736 642 | 8/2001 |
| AU | 739 635 | 10/2001 |
| CA | 1324539 | 11/1993 |
| CN | 1170950 | 1/1998 |
| EP | 0 166 363 A2 | 1/1986 |
| EP | 0 203 730 A2 | 12/1986 |
| EP | 0 278 060 A2 | 8/1988 |
| EP | 0 278 060 A3 | 8/1988 |
| EP | 0 282 188 A1 | 9/1988 |
| EP | 0 314 413 A2 | 5/1989 |
| EP | 0 327 906 A1 | 8/1989 |
| EP | 0 352 180 A1 | 1/1990 |
| EP | 0 166 363 B1 | 8/1991 |
| EP | 0 282 188 B1 | 11/1991 |
| EP | 0 492 545 A3 | 7/1992 |

(Continued)

OTHER PUBLICATIONS

Kondo et al., "Antireflective films and display devices," Chem. Abs. 127: 72776w, p. 52 (1997).

"Mechanical Properties of Sputtered Films," brochure of Cerac Coating Materials News, CERAC, Inc., Milwaukee, WI, 3 pages, vol. 2, Issue 3, (Jul.–Sep. 1992).

W. J. Smith, *Modern Optical Engineering: The Design of Optical Systems*, 2$^{nd}$ Ed.; McGraw–Hill, Inc., New York; Title page, Publication page, Table of Contents, and pp. 125–128 (10 pgs) (1990).

(Continued)

*Primary Examiner*—Timothy Meeks

(57) ABSTRACT

An antisoiling coating for an antireflective surface, particularly the outer surface of an antireflective film stack, wherein the antisoiling coating includes a fluorinated siloxane, preferably prepared by applying a coating composition of a fluorinated silane of the following formula:

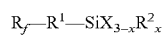

$$R_f—R^1—SiX_{3-x}R^2_x$$

wherein:

$R_f$ is a perfluorinated group optionally containing one or more heteroatoms;

$R^1$ is a divalent alkylene group, arylene group, or mixture thereof, substituted with one or more heteroatoms or functional groups, containing about 2 to about 16 carbon atoms;

$R^2$ is a lower alkyl group;

X is a halide, a lower alkoxy group, or an acyloxy group; and x is 0 or 1.

U.S. PATENT DOCUMENTS

| | | | |
|---|---|---|---|
| 4,940,602 A | 7/1990 | Taniguchi et al. | |
| 4,970,099 A | 11/1990 | Adams et al. | |
| 4,981,727 A | 1/1991 | Brinduse et al. | |
| 4,983,459 A | 1/1991 | Franz et al. | |
| 4,983,666 A | 1/1991 | Zavatteri et al. | |
| 4,990,418 A | 2/1991 | Mukoh et al. | |
| 4,997,684 A | 3/1991 | Franz et al. | |
| 5,015,523 A | * 5/1991 | Kawashima et al. | 428/336 |
| 5,068,135 A | 11/1991 | Zavatteri et al. | |
| 5,071,709 A | 12/1991 | Berquier et al. | |
| 5,081,192 A | 1/1992 | Tatemoto | |
| 5,091,244 A | 2/1992 | Biornard | |
| 5,105,310 A | 4/1992 | Dickey | |
| 5,124,467 A | 6/1992 | Rodgers et al. | |
| 5,139,879 A | 8/1992 | Aharoni et al. | |
| 5,147,125 A | 9/1992 | Austin | |
| 5,150,004 A | 9/1992 | Tong et al. | |
| 5,153,481 A | 10/1992 | Matsuda et al. | |
| 5,194,326 A | 3/1993 | Arthur et al. | |
| 5,248,915 A | 9/1993 | Tong et al. | |
| 5,248,916 A | 9/1993 | Tong et al. | |
| 5,262,557 A | 11/1993 | Kishita et al. | |
| 5,270,858 A | 12/1993 | Dickey | |
| 5,271,806 A | 12/1993 | Deutsch et al. | |
| 5,274,159 A | 12/1993 | Pellerite et al. | |
| 5,281,893 A | 1/1994 | Matsuda et al. | |
| 5,284,707 A | 2/1994 | Ogawa et al. | |
| 5,288,889 A | 2/1994 | Takago et al. | |
| 5,306,758 A | 4/1994 | Pellerite | |
| 5,324,566 A | 6/1994 | Ogawa et al. | |
| 5,328,768 A | 7/1994 | Goodwin | |
| 5,338,877 A | 8/1994 | Sawada et al. | |
| 5,368,892 A | 11/1994 | Berquier | |
| 5,372,874 A | 12/1994 | Dickey et al. | |
| 5,382,639 A | 1/1995 | Moore et al. | |
| 5,389,427 A | * 2/1995 | Berquier | 428/210 |
| 5,407,709 A | 4/1995 | Ogawa et al. | |
| 5,407,733 A | 4/1995 | Bjornard et al. | |
| 5,437,894 A | 8/1995 | Ogawa et al. | |
| 5,446,205 A | 8/1995 | Marchionni et al. | |
| 5,450,238 A | 9/1995 | Bjornard et al. | |
| 5,514,731 A | 5/1996 | Nakai | |
| 5,570,161 A | 10/1996 | Andrews et al. | |
| 5,579,162 A | 11/1996 | Bjornard et al. | |
| 5,580,819 A | 12/1996 | Li et al. | |
| 5,622,784 A | 4/1997 | Okaue et al. | |
| 5,688,864 A | 11/1997 | Goodwin | |
| 5,744,227 A | 4/1998 | Bright et al. | |
| 5,763,061 A | 6/1998 | Ochiai et al. | |
| 5,783,299 A | * 7/1998 | Miyashita et al. | 428/329 |
| 5,800,918 A | 9/1998 | Chartier et al. | |
| 5,922,787 A | 7/1999 | Kondo et al. | |
| 5,972,517 A | 10/1999 | Kondo et al. | |
| 5,981,059 A | 11/1999 | Bright et al. | |
| 5,997,943 A | * 12/1999 | Azzopardi et al. | 427/167 |
| 6,013,722 A | 1/2000 | Yang et al. | |
| 6,183,872 B1 | 2/2001 | Tanaka et al. | |
| 6,221,434 B1 | 4/2001 | Visca et al. | |
| 6,243,203 B1 | * 6/2001 | Schleipen et al. | 359/581 |
| 6,277,485 B1 | 8/2001 | Invie et al. | |
| 2005/0008784 A1 | 1/2005 | Martin et al. | |

FOREIGN PATENT DOCUMENTS

| | | |
|---|---|---|
| EP | 0 492 545 A2 | 7/1992 |
| EP | 0 327 906 B1 | 8/1992 |
| EP | 0 352 180 B1 | 12/1992 |
| EP | 0 203 730 B1 | 6/1993 |
| EP | 0 545 201 A3 | 6/1993 |
| EP | 0 545 201 A2 | 6/1993 |
| EP | 0 343 526 B1 | 9/1993 |
| EP | 0 564 134 A3 | 10/1993 |
| EP | 0 564 134 A2 | 10/1993 |
| EP | 0 278 060 B1 | 4/1994 |
| EP | 0 687 533 A1 | 12/1995 |
| EP | 0 692 463 A1 | 1/1996 |
| EP | 0 719 821 A1 | 7/1996 |
| EP | 0 738 771 A1 | 10/1996 |
| EP | 0 745 568 A1 | 12/1996 |
| EP | 0 749 021 A2 | 12/1996 |
| EP | 0 749 021 A3 | 12/1996 |
| EP | 0 603 697 B1 | 9/1997 |
| EP | 0 797 111 A3 | 9/1997 |
| EP | 0 797 111 A2 | 9/1997 |
| EP | 0 492 545 B1 | 3/1998 |
| EP | 0 841 581 A1 | 5/1998 |
| EP | 0 844 265 A1 | 5/1998 |
| EP | 0 692 463 B1 | 4/1999 |
| EP | 0 745 568 B1 | 7/1999 |
| EP | 0 545 201 B1 | 10/1999 |
| EP | 0 564 134 B1 | 12/1999 |
| EP | 1 000 124 | 5/2000 |
| EP | 0 687 533 B1 | 9/2000 |
| EP | 1 051 448 | 11/2000 |
| EP | 0 738 771 B1 | 7/2001 |
| EP | 1 255 129 A2 | 6/2002 |
| EP | 0 749 021 B1 | 3/2003 |
| EP | 0 797 111 B1 | 10/2003 |
| GB | 2 306 126 A | 4/1997 |
| GB | 2306126 A | 4/1997 |
| JP | 58-046301 A | 3/1983 |
| JP | 58-126502 | 7/1983 |
| JP | 58-172244 | 10/1983 |
| JP | 58-213653 | 12/1983 |
| JP | 58-216195 A | 12/1983 |
| JP | 59-020401 A | 2/1984 |
| JP | 59-026944 | 2/1984 |
| JP | 59-049501 A | 3/1984 |
| JP | 59-115840 | 7/1984 |
| JP | 61-018901 | 1/1986 |
| JP | 61-040845 | 2/1986 |
| JP | 61-247743 | 11/1986 |
| JP | 63-021601 | 1/1988 |
| JP | 63-228101 | 9/1988 |
| JP | 63-296002 | 12/1988 |
| JP | 64-86101 | 3/1989 |
| JP | 1-294709 | 11/1989 |
| JP | 02-003472 | 1/1990 |
| JP | 2-019801 | 1/1990 |
| JP | 2-1165543 | 5/1990 |
| JP | 3-266801 | 11/1991 |
| JP | 4-213384 | 8/1992 |
| JP | 04-342592 A | 11/1992 |
| JP | 4-342592 | 11/1992 |
| JP | 05-140509 A | 6/1993 |
| JP | 5-196802 | 8/1993 |
| JP | 5-254073 | 10/1993 |
| JP | 5-339007 | 12/1993 |
| JP | 5-341103 | 12/1993 |
| JP | 6-011602 | 1/1994 |
| JP | 6-025599 | 2/1994 |
| JP | 6-082603 | 3/1994 |
| JP | 6-082605 | 3/1994 |
| JP | 6-103928 | 4/1994 |
| JP | 6-279061 | 10/1994 |
| JP | 6-324214 | 11/1994 |
| JP | 7-081978 | 3/1995 |
| JP | 7-173412 | 7/1995 |
| JP | 7-287101 | 10/1995 |
| JP | 7-300346 | 11/1995 |
| JP | 7-315882 | 12/1995 |

| JP | 09-13017 | * | 1/1997 |
| JP | 9-127307 | | 5/1997 |
| JP | 9-133802 | | 5/1997 |
| JP | HEI 9-255919 | | 9/1997 |
| JP | 9-326240 | | 12/1997 |
| JP | 10-026701 | | 1/1998 |
| JP | HEI 10-143087 | | 5/1998 |
| WO | WO 95/23804 A1 | | 9/1995 |
| WO | WO 96/11289 A1 | | 4/1996 |
| WO | WO 96/31343 A1 | | 10/1996 |
| WO | WO 97/07155 A1 | | 2/1997 |
| WO | WO 99/06490 A1 | | 2/1999 |
| WO | WO 99/37720 A1 | | 7/1999 |
| WO | WO 99/38034 A1 | | 7/1999 |

OTHER PUBLICATIONS

I.M. Thomas et al., "A novel perfluorinated AR and protective coating for KDP and other optical materials," *Proc. SPIE—Int. Soc. Opt. Eng.,* SPIE vol. 1441, Title page, Publication page, Table of Contents, and pp. 294–303 (16 pgs) (1991).

A. Ulman, "Monolayers of Organosilicon Derivatives," Chapter 3.2, in Part Three: Self–Assembled Monolayers, *An Introduction to Ultrathin Organic Films: from Langmuir–Blodgett to Self–Assembly,* Academic Press; Boston; Title page, Publication page, Table of Contents, and pp. 245–253 (16 pgs) (1991).

S. R. Wasserman et al., "Structure and Reactivity of Alkyl–siloxane Monolayers Formed by Reaction of Alkyltrichlorosilanes on Silicon Substrates," *Langmuir,* 5, 1074–1087 (1989).

"Viratec—Clarifying Your Point–of–View with Thin Film Coatings," Product Information Brochure from Viratec Thin Films, Inc., Fairbault, MN, 8 pgs, (no date indicated).

* cited by examiner

US 5,851,674 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 16–30 and 38 is confirmed.

Claims 1, 11, 15, 32–37 and 39 are cancelled.

Claims 2–10, 12–14 and 31 are determined to be patentable as amended.

2. The [antireflective article] *method* of claim [1] *16* wherein the antireflective surface comprises a metal oxide film having one or more metal oxides.

3. The [antireflective article] *method* of claim 2 wherein the antireflective surface comprises a sputter coated metal oxide film.

4. The [antireflective article] *method* of claim 3 wherein the antisoiling coating is at least about 20 Angstroms thick.

5. The [antireflective article] *method* of claim [1] *16* wherein the antisoiling coating comprises a fluorinated siloxane base film of an approximately monolayer thickness on which is adsorbed oligomeric fluorinated siloxane material in an amount that does not significantly reduce the antireflective characteristics of the antireflective article.

6. The [antireflective article] *method* of claim [1 which ] *16 wherein the substrate with the antireflective surface and the antisoiling coating thereon* has a first surface antireflectivity that is less than about 0.2 percent different than that of the same [article] *substrate* without the antisoiling coating.

7. The [antireflective article] *method* of claim [1] *16* wherein [the coating is prepared by applying a coating composition comprising a fluorinated silane wherein] each X is a halide.

8. The [antireflective article] *method* of claim [1] *16* wherein [the coating is prepared by applying a coating composition comprising a fluorinated silane wherein] $R_f$ is a perfluoroalkyl group of the formula $C_nF_{2n+1}$ wherein n is about 4 to about 20.

9. The [antireflective article] *method* of claim 8 [wherein the coating is prepared by applying a coating composition comprising a fluorinated silane] wherein $R_f$ is a perfluoroalkyl group of the formula $C_nF_{2n+1}$ wherein n is about 7 to about 10.

10. [The] *An* antireflective article [of claim 1 wherein the coating is] *comprising a substrate having an antireflective surface and an antisoiling coating of less than about 100 Angstroms thick deposited thereon; wherein the antisoiling coating comprises a fluorinated siloxane* prepared by applying a coating composition comprising a fluorinated silane selected from the group of $C_7F_{15}CH_2OCH_2CH_2CH_2SiCl_3$, $C_7F_{15}CH_2OCH_2CH_2CH_2Si(CH_3)Cl_2$, $C_7F_{15}CH_2OCH_2CH_2CH_2SiCl(OCH_2)_2$, $C_7F_{15}CH_2OCH_2CH_2CH_2SiCl_3(OC_2H_5)$, $C_8F_{17}SO_2N(Et)CH_2CH_2CH_2SiCl_3$, $C_8F_{17}SO_2N(Me)CH_2CH_2CH_2Si(CH_3)Cl_2$, and $C_7F_{15}CH_2OCH_2CH_2CH_2Si(OAc)_3$, and mixtures thereof.

12. The [antireflective article] *method* of claim [11] *29* wherein the antireflective surface comprises a metal oxide film having one or more metal oxides.

13. The [antireflective article] *method* of claim 12 wherein the antireflective surface comprises a sputter coated metal oxide film.

14. The [antireflective article] *method* of claim [11 which] *29 wherein the substrate with the antireflective surface and the antisoiling coating thereon* has a first surface antireflectivity that is less than about 0.2 percent different than that of the same [article] *substrate* without the antisoiling coating.

31. [A] *The* method of [applying an antisoiling coating to a substrate having an antireflective surface, the method comprising] *claim 16 wherein treating the antireflective surface comprises* immersing the substrate in a coating composition comprising less than about 0.5 weight percent of a fluorinated silane for less than about 20 minutes and removing the coated antireflective substrate, wherein upon removal the coated substrate emerges substantially autophobic.

* * * * *